(12) United States Patent
Shikata et al.

(10) Patent No.: US 7,756,916 B2
(45) Date of Patent: Jul. 13, 2010

(54) DISPLAY METHOD

(75) Inventors: Yasushi Shikata, Sagamihara (JP); Kazuna Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 11/447,112

(22) Filed: Jun. 6, 2006

(65) Prior Publication Data

US 2006/0282407 A1    Dec. 14, 2006

(30) Foreign Application Priority Data

Jun. 10, 2005    (JP)    ............... 2005-170880

(51) Int. Cl.
*G06F 17/30*    (2006.01)
*G06F 17/00*    (2006.01)

(52) U.S. Cl. ............... 707/999.003; 707/706; 707/758; 707/915

(58) Field of Classification Search ........ None
See application file for complete search history.

(56) References Cited

U.S. PATENT DOCUMENTS

| | | | | |
|---|---|---|---|---|
| 5,850,218 A * | 12/1998 | LaJoie et al. | ........ | 725/45 |
| 6,100,884 A * | 8/2000 | Tomita et al. | ........ | 715/721 |
| 6,865,746 B1 * | 3/2005 | Herrington et al. | ........ | 725/53 |
| 6,928,262 B1 * | 8/2005 | Kanemitsu | ........ | 455/3.06 |
| 2001/0024565 A1 * | 9/2001 | Yui et al. | ........ | 386/83 |
| 2002/0044144 A1 * | 4/2002 | Inoue | ........ | 345/204 |
| 2003/0050855 A1 * | 3/2003 | Jaffe et al. | ........ | 705/26 |
| 2003/0105853 A1 * | 6/2003 | Morito et al. | ........ | 709/223 |
| 2003/0195877 A1 * | 10/2003 | Ford et al. | ........ | 707/3 |
| 2004/0123319 A1 * | 6/2004 | Kim | ........ | 725/53 |
| 2005/0033747 A1 * | 2/2005 | Wittkotter | ........ | 707/10 |
| 2005/0044037 A1 * | 2/2005 | Lawrence et al. | ........ | 705/38 |
| 2008/0295132 A1 | 11/2008 | Icho et al. | | |

FOREIGN PATENT DOCUMENTS

| | | |
|---|---|---|
| JP | 11-261908 | 9/1999 |
| JP | 2001-148813 | 5/2001 |
| JP | 2003-051753 | 2/2003 |
| WO | 2005048587 A1 | 5/2005 |

* cited by examiner

*Primary Examiner*—Yicun Wu
*Assistant Examiner*—Yu Zhao
(74) *Attorney, Agent, or Firm*—Fitzpatrick, Cella, Harper & Scinto

(57) ABSTRACT

A display method comprises the steps of: searching, from a group of information including information associated with a plurality of programs, information corresponding to information obtained by extracting, using at least one of databases including: databases for a name of person, an attribute name of person, a name of thing and an attribute name of thing; databases for a name of place, an attribute name of place, a name of event, an attribute name of event; and databases into which a part or all of the databases is integrated, at least one of the information which can be identified in the database being used, from a group of information associated with a selected program; and displaying information on a program associated with the searched information.

10 Claims, 13 Drawing Sheets

FIG. 10

PROGRAM RELATED INFORMATION ON PROGRAM A 902 ⌐801

```
PROGRAM NAME      : GLUTTON OF MR. MS! COMIC DIALOG
BROADCASTING HOURS: 2005/01/24
START TIME        : 9:00
DURATION          : 1 HOUR
GENRE             : INFORMATION/VARIETY SHOW
PROGRAM OUTLINE   : MISS. NS & MR. ST COMES TO STORE TO SHINJUKU KABUKI-CHO!
                    RAMEN-NOODLES ORDER
PROGRAM DETAILS   : FIRST SPECIAL TALK!! MR. T TELLS THE DARK SPACE OF K COUNTRY,
                    AND FAMILY LOVE ▽ MR. G TALKS LAWMAKER PENSION REFORM ON AIR.
PERFORMER         : MR. MS, MISS. TY, MR. HS
```

INFORMATION OF CHARACTER STRING ON PROGRAM A ⌐802

```
PROGRAM NAME      : GLUTTON OF MR. MS! COMIC DIALOG
PROGRAM OUTLINE   : MISS. NS & MR. ST COMES TO STORE TO SHINJUKU KABUKI-CHO!
                    RAMEN-NOODLES ORDER
PROGRAM DETAILS   : FIRST SPECIAL TALK!! MR. T TELLS THE DARK SPACE OF K COUNTRY,
                    AND FAMILY LOVE ▽ MR. G TALKS LAWMAKER PENSION REFORM ON AIR.
PERFORMER         : MR. MS, MISS. TY, MR. HS
```

EXTRACT INFORMATION ABOUT "CATEGORY: ⌐803        EXTRACT THE INFORMATION ABOUT "CATEGORY: ⌐804
NAME OF PERSON" OF PROGRAM A                    NAME OF PLACE" OF PROGRAM A

| MR. MS, MISS. NS, MR. ST, MR. T, | | SHINJUKU, KABUKI-CHO, K COUNTRY |
| MR. G, MISS. TY, MR. HS | |

FIG. 11

TELEVIEWER'S CATEGORY PRIORITY EXAMPLE CLASSIFIED BY GENRE

| GENRE | CATEGORY PRIORITY | | |
|---|---|---|---|
| | 1 | 2 | 3 |
| DRAMA | NAME OF PERSON | TRACK NAME | NAME OF PLACE |
| MOVIE | NAME OF PERSON | NAME OF PLACE | TRACK NAME |
| MUSIC | TRACK NAME | NAME OF PERSON | NAME OF PLACE |
| INFORMATION | STORE NAME | CAR'S NAME | NAME OF PERSON |
| SPORT | SPORT NAME | NAME OF PERSON | NAME OF PLACE |
| ⋮ | | | |

FIG. 12

TELEVIEWER'S CATEGORY PRIORITY EXAMPLE

| PRIORITY | CATEGORY |
|---|---|
| 1 | NAME OF PERSON |
| 2 | TRACK NAME |
| 3 | NAME OF PLACE |
| 4 | STORE NAME |
| 5 | SPORT NAME |
| 6 | CAR'S NAME |
| 7 | FOOD NAME |
| ⋮ | |

↑ TOP THREE CATEGORIES

FIG. 13

DETERMINATION METHOD OF CATEGORY PRIORITY

EXAMPLE OF PROGRAM RELATED INFORMATION 905

| PROGRAM | CATEGORY | CATEGORY VALUE |
|---|---|---|
| PROGRAM X | NAME OF PERSON | PERFORMER A<br>PERFORMER D<br>SUPERVISOR E |
| | TRACK NAME | CLASSIC MUSIC C |
| | NAME OF PLACE | PLACE B |
| | ⋮ | ⋮ |
| PROGRAM Y | NAME OF PERSON | PERFORMER A<br>PERFORMER G |
| | TRACK NAME | CLASSIC MUSIC C<br>POP MUSIC H |
| | NAME OF PLACE | PLACE B |
| | ⋮ | ⋮ |
| PROGRAM Z | NAME OF PLACE | PERFORMER A<br>SUPERVISOR I |
| | TRACK NAME | CLASSIC MUSIC C |
| | NAME OF PLACE | PLACE J |
| | ⋮ | ⋮ |
| PROGRAM W | NAME OF PERSON | PERFORMER A<br>SUPERVISOR K |
| | TRACK NAME | POP MUSIC L |
| | NAME OF PLACE | PLACE M |
| | ⋮ | ⋮ |
| ⋮ | ⋮ | ⋮ |

↓ ACCUMULATION VALUE OF CATEGORY VALUE 908

| | CATEGORY VALUE | THE NUMBER OF APPEARANCE ACCUMULATION |
|---|---|---|
| 1 | PERFORMER A | 4 |
| 2 | CLASSIC MUSIC C | 3 |
| 3 | PLACE B | 2 |
| 4 | ⋮ | ⋮ |

→

CATEGORY PRIORITY

| | CATEGORY |
|---|---|
| 1 | NAME OF PERSON |
| 2 | TRACK NAME |
| 3 | NAME OF PLACE |
| 4 | ⋮ |

DISPLAY METHOD

BACKGROUND OF THE INVENTION

The present invention relates to a display method.

Japanese Patent Application Laid-Open No. 11-261908 describes a method (means) of searching a program using information (keyword) related to the program in a program and/or information selection support apparatus. Specifically, a technique is disclosed in which with pictures of a plurality of user's favorite performers being displayed the user selects his/her most favorite performer from the performers and then presses a search start button to start a search. In addition, there is disclosed a technique of displaying on a screen character strings in different colors which serve as keyword candidates.

SUMMARY OF THE INVENTION

An object of the present invention is to provide a novel configuration capable of suitably displaying information on a program related to a selected program.

According to one aspect of the present invention, a display method is configured as follows.

A display method comprising the steps of:

searching, from a group of information including information associated with a plurality of programs, information corresponding to information obtained by extracting, using at least one of databases, at least one of a plurality of pieces of information which can be identified in the database being used, from a group of information associated with a selected program, the databases including: a database in which information indicating a name of person can be identified; a database in which information indicating an attribute name of person can be identified; a database in which information indicating a name of thing can be identified; a database in which information indicating an attribute name of thing can be identified; a database in which information indicating a name of place can be identified; a database in which information indicating an attribute name of place can be identified; a database in which information indicating a name of event can be identified; a database in which information indicating an attribute name of event can be identified; and a database into which a part or all of the databases is integrated, the plurality of pieces of information including: information indicating a name of person; information indicating an attribute name of person; information indicating a name of thing; information indicating an attribute name of thing; information indicating a name of place; information indicating attribute name of place; information indicating a name of event; and information indicating an attribute name of event; and displaying information on a program associated with the searched information.

Here, examples of the name of person include the real name, pseudonym, common name, and the like of a person. Examples of the attribute name of person include a "president", a "committee member", a "minister", a "pattern maker", a "billionaire", a "group leader", and the like. Examples of the name of thing include a "bat", a "hot-air balloon", and the like. Examples of the attribute name of thing include a "tool", "peripheral equipment", and the like. Examples of the name of place include "Kyoto", "Madrid", and the like. Examples of the attribute name of place include an "amusement park", a "ranch", and the like. Examples of the name of event include "Big Bang", "Great Kanto Earthquake", "World Cup", and the like. Examples of the attribute name of event include a "fraud case", a "festival", and the like.

Here, the object to be extracted includes the types of names such as the name of person, the attribute name of person, the name of thing, the attribute name of thing, the name of place, the attribute name of place, the name of event, and the attribute name of event. Extraction of information indicating these names does not require that a certain name belongs only to a single type. Depending on the contents of a database, for example, a "fraud case" may be extracted as the attribute name of event or may be extracted as the name of event. Information indicating "Superman" may be stored in a database as information indicating the name of person or may be stored as information indicating the attribute name of person. Alternatively, information indicating "Superman" may be stored as information indicating the name of thing or may be stored as information indicating the name of event.

Here, the database indicates a set of a plurality of data units which serve as the object to be compared for extraction. Therefore, for example, a database in which information indicating the name of person can be identified has a plurality of data units on names as data indicating the name of person. The name of person does not need to be the name recorded in the registry books; a pseudonym, an abbreviation, and the like can also be used.

According to another aspect of the present invention, a display method is configured as follows.

A display method comprising the steps of:

searching, from a group of information including information associated with a plurality of programs, information corresponding to information obtained by extracting information indicating a name of person from a group of information associated with a selected program; and displaying information on a program associated with the searched information, wherein the group of information associated with the selected program has a structure in which a first area having described therein information indicating a performer's name and a second area different from the first area are specified, and the information obtained by extraction is information obtained by extracting the information indicating the name of person with at least a group of information described in the second area being an extraction population.

Here, a configuration in which the information corresponding to extracted information is the same information as the extracted information or information having the same or nearly the same meaning as the extracted information can be suitably adopted.

The information associated with a program includes information specified as attribute information on the program and information specified as attribute information on a scene of the program. For these attribute information, a program name, a summary description, a performer's name, and the like which are provided by the sending side of the program (the distributor (broadcasting station) of the program or the producer of the program) or the creator of a program table other than the sender of the program, so as to be associated with the program can be suitably adopted.

Here, for the structure in which at least a first area having described therein information indicating a performer's name and a second area different from the first area are specified, for example, a data structure of section format defined in the MPEG-2 Systems (ITU-TH.222.0, ISO/IEC 13818-1) corresponds to such a structure.

In the "program lineup information (ARIB STD-B10) used in digital broadcasting" defined by ARIB (Association of Radio Industries and Businesses), the aforementioned MPEG-2 Systems are extended and a part of information associated with a program is stored in an EIT (Event Information Table) and transmitted. The EIT has a data structure of section format. Section format data is variable length and predetermined data types (an identifier, time information, and descriptor information) are stored in a predetermined order. Among them, in a descriptor area of the EIT, details of the information associated with the program are stored. Specific examples of descriptors are provided below.

Examples of Descriptors

Component descriptor: describes the type of component (video, audio, or the like) and also a video format and the like.

Content descriptor: describes genre information.

Short event descriptor: describes a program name, a program outline, and the like.

Extended event descriptor: describes (1) a detailed description of a program; and (2) a performer's name, program details, announcement from the program, and the like.

In the "program lineup information (ARIB STD-B10) used in digital broadcasting", an area in which information indicating a performer's name is described is provided as an extended event descriptor. In the extended event descriptor, are described data that specifies the size of an area in which the name of an item is described, followed by text data (e.g., "performer") of the name of the item. Subsequent to that, data that specifies the size of an area in which specific contents of the item are described is described followed by text data (e.g., Taro Suzuki and Jiro Yamamoto) of the specific contents of the item.

Other items can also be sequentially described as an extended event descriptor and in the same format. For example, before or after the aforementioned area regarding the performer's name, and subsequent to data that specifies the number of bits of the area that specifies the name of an item, "program details" are described as text data of the name of the item. Subsequent to that, data that specifies the size of an area in which specific contents of the item are described is described, followed by specific text data of the item. For the text data, for example, the following is described: "Although Sakamoto (Taro Suzuki) who had been selected as a representative player damaged the ligament, he quickly recovered by appropriate treatment given by a doctor (Jiro Yamamoto). A nurse (Kotetsu Kudo) who assisted in the treatment had a secret. Sakamoto who happened to know the secret was told a mysterious story from Keiko (Sakura Yamada). Just then, a huge object came flying above Mount Fuji. When Keiko cast a magical spell, the object begins to emit intense light and the strongest storm in history occurs. Director Akira Sudo, winner of the Cannes Grand Prix presents a spectacular film, which is broadcasted on TV for the first time ever".

Descriptors other than an extended event descriptor can also be used. For example, a short event descriptor is defined in the "program lineup information (ARIB STD-B10) used in digital broadcasting", and in the short event descriptor a program name and a program outline can be described.

Examples of the "program lineup information (ARIB STD-B10) used in digital broadcasting" are provided above; however, the present invention is not limited thereto.

The structure in which a first area having described therein information indicating a performer's name is specified indicates a structure configured such that the information described in the area being information for identifying a performer can be identified by an apparatus that processes the information. Therefore, it is not always necessary to indicate, in text data, that a performer is described as the name of an item such as "performer". For example, a data structure can also be adopted in which information for identification such as 111 is described and thereafter the actual performer's name is described. If an apparatus that processes this information is configured to be able to determine that information following the identification information of 111 is information that identifies a performer, it is not necessary to describe text data "performer" as the name of an item. In addition, if a standard is set such that a fixed area is assigned as an area in which information indicating a performer's name is described, a group of information itself that is associated with a program does not need to include information for specifying in which area the information indicating the performer's name is described.

The data structure in which a first area having described therein information indicating a performer's name and a second area different from the first area are specified is a data structure in which an area other than the first area is specified. For the second area, at least one of an area in which detailed contents of a program are described, an area in which a program outline is described, and an area in which a program name is described can be suitably employed. For these areas too, a structure in which an area can be identified by information that identifies the name of an item such as "program details", "program outline", or "program name", a structure in which an area can be identified by information that identifies the contents of information described in the area, a structure in which a fixed area is assigned, or the like can be suitably employed.

In the above-described invention, it is suitable that the information indicating the name of person is extracted using a database in which the name of person can be identified.

In the above-described invention, a configuration can be suitably adopted in which the information obtained by extraction from the group of information associated with the selected program is information obtained by extraction before the selected program is selected by a user of an apparatus that performs the display method. In particular, a configuration can be suitably adopted in which the extraction is performed in advance on a plurality of programs that are likely to be selected by the user.

In the above-described invention, a configuration can be suitably adopted in which the searching step is performed without receiving, after the selected program is selected, an instruction for a search from a user of an apparatus that performs the display method.

In the above-described invention, a configuration can be suitably adopted in which the searching step includes, when there are a plurality of pieces of the information which is extracted from the group of information associated with the selected program, a step of selecting from the pieces of extracted information a piece of information based on a predetermined selection condition.

For a selection based on a predetermined selection condition, a configuration can be suitably adopted in which information for allowing user's preference to be reflected in the selection is configured to be outputable and using the information for allowing user's preference to be reflected a piece of information is selected from the plurality of pieces of extracted information.

In the above-described invention, a configuration can be suitably adopted in which in the displaying step, pieces of information on a plurality of programs which are respectively associated with the pieces of information searched in the searching step are displayed on a same screen.

When pieces of information on a plurality of programs searched in the searching step are displayed on the same screen, the following operation is suitably performed. Specifically, different directions are instructed using direction instruction keys on an operation device which is operated by the user, so as to obtain a state in which among a plurality of programs whose information is displayed each of different programs is selected. Here, it is preferable to provide display such that the instruction directions by the direction instruction keys are associated with the display positions of the information on the plurality of programs. Note that the state in which a program is selected indicates either a state in which the position where information on a program is displayed is focused or a state in which the channel of a program is selected and the program is being played. The direction instruction keys are not limited to buttons, and various input devices that allow the user to specify a direction can be employed. In addition, the direction instruction keys may be a set of independent keys for different directions or a single key, such as a stick-type key, that allows the user to select one of a plurality of directions.

DESCRIPTION OF THE DRAWINGS

FIG. 10 is a flowchart of extracting category information from program related information 902;

FIG. 11 is a diagram showing exemplary category priority 907 classified by genre;

FIG. 12 is a diagram showing exemplary category priority 906; and

FIG. 13 is a diagram showing a determination method of the category priority 906.

DETAILED DESCRIPTION OF THE INVENTION

An embodiment of the present invention will be described below.

A display method of the present invention includes a display (and selection) method in an apparatus having a display, such as a computer or a digital television apparatus. In particular, a digital television apparatus is a preferred embodiment in which the present invention is implemented, in terms of its capability of easily obtaining information related to contents (particularly a program) from a broadcasting station or the Internet. The embodiment of the present invention will be described in detail below using a digital television apparatus as an example.

Figure 7:
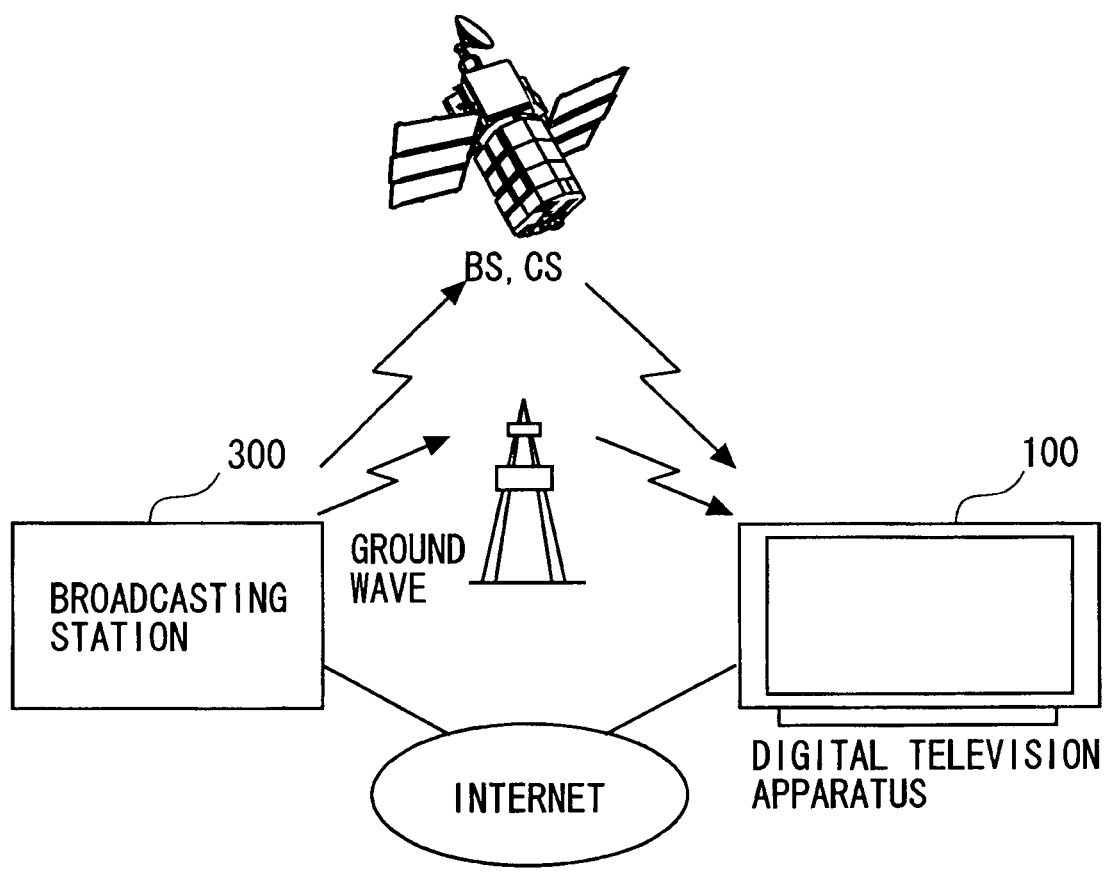
FIG. 7 is a diagram showing a system configuration according to the embodiment of the present invention.

FIG. 7 is a diagram showing an exemplary system configuration according to the embodiment of the present invention. A digital television apparatus 100 is capable of receiving, via cable or radio, BS (Broadcast satellite), CS (Communication Satellite), and terrestrial digital broadcasting or analog broadcasting transmitted from a broadcasting station 300. In addition, the digital television apparatus 100 is connected to the Internet and thus is capable of performing interactive communication with the broadcasting station 300. A televiewer can operate the digital television apparatus 100 using a remote control 200.

Figure 3:
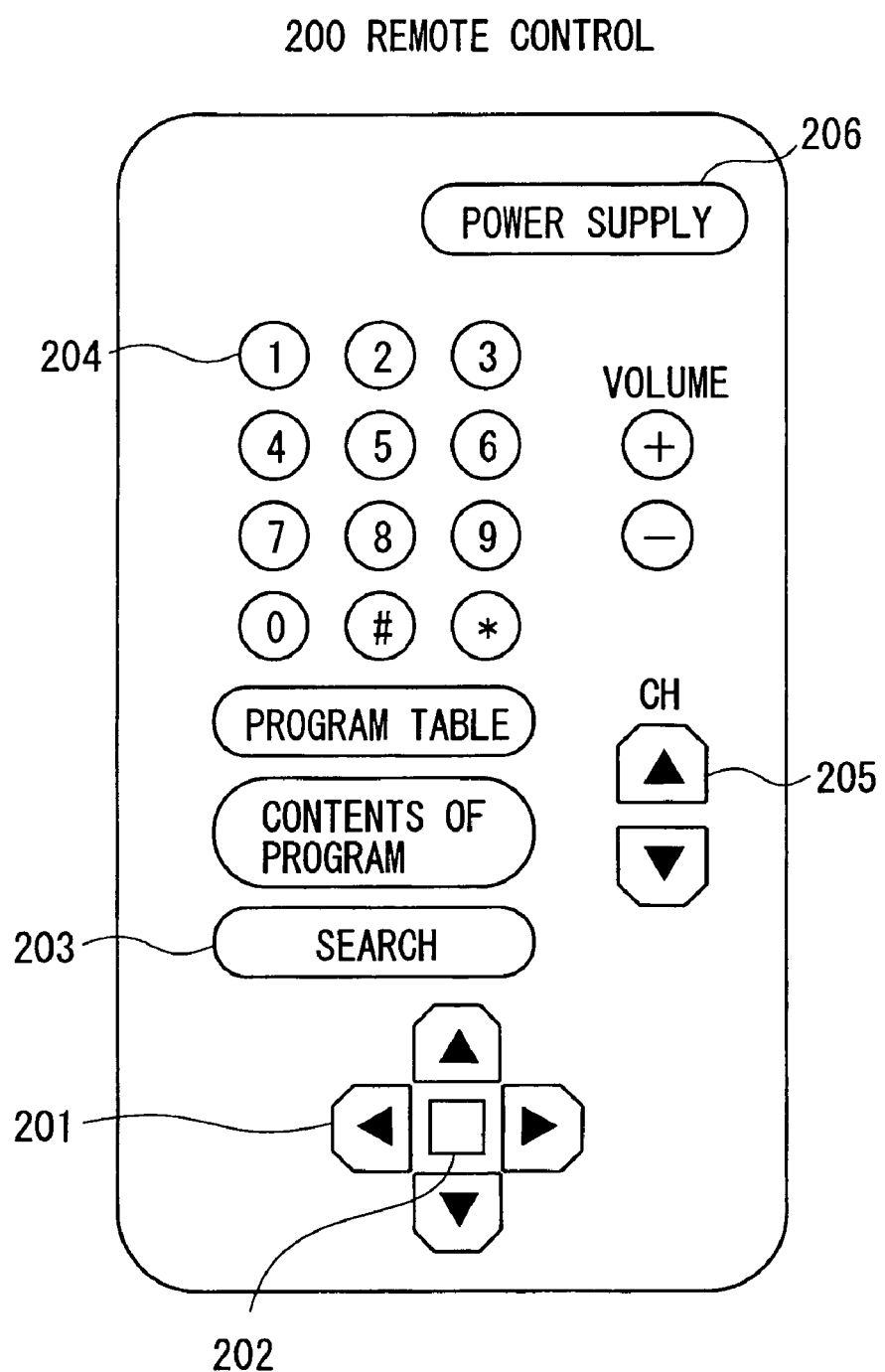
FIG. 3 is a diagram showing an exemplary configuration of remote control keys on a remote control 200.

FIG. 3 is a diagram showing an exemplary configuration of remote control keys on the remote control 200. The remote control 200 has at least normal up/down keys 205, numeric keypad 204, power key 206, up, down, left, and right arrow keys 201, determination key 202, and search key 203 used to search a related program. In addition to these, the remote control 200 has a "program table" key used to display an EPG and a "contents of program" key used to display the contents of a program.

Figure 2:
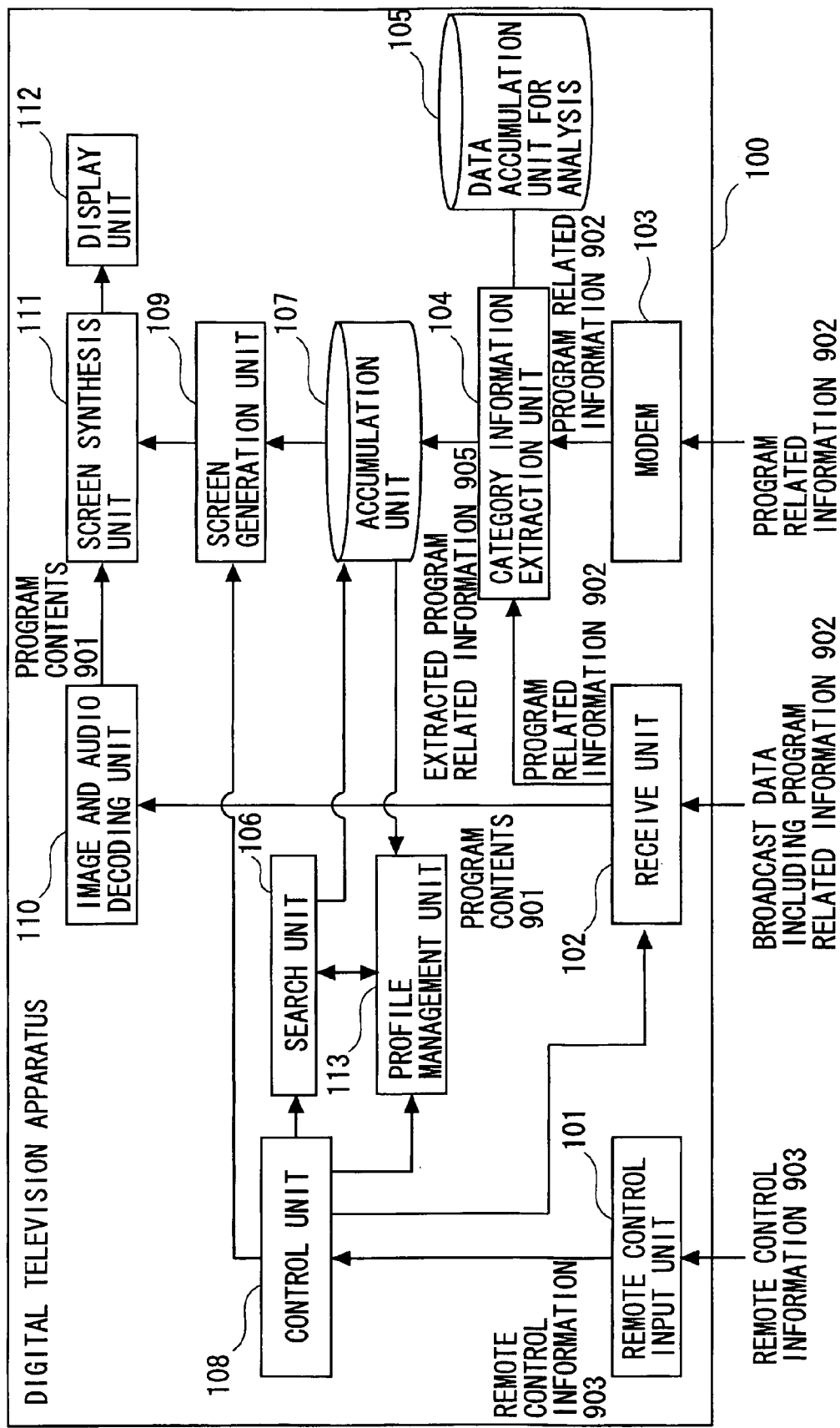
FIG. 2 is a diagram showing an internal configuration of a digital television apparatus 100 according to an embodiment of the present invention.

FIG. 2 is a diagram showing an internal configuration of the digital television apparatus 100 necessary to implement the present invention. The digital television apparatus 100 receives, through a receive unit 102, digital or analog broadcasting. Broadcast data received by the receive unit 102 is demodulated and separated and then divided into AV streams (hereinafter referred to as "program contents 901") such as video and audio that compose a program and information about the program (hereinafter referred to as "program related information 902").

Thereafter, the program contents 901 are sent to an image and audio decoding unit 110 and the program related information 902 is sent to a category information extraction unit 104. The program related information 902 has the same contents as program information included in SI (Service Information) which is currently sent via BS digital broadcasting or terrestrial digital broadcasting. Alternatively, the program related information 902 has the same contents as program information (meta data) used in server-type broadcasting which is expected to come into service in the future.

The program information (corresponding to a "group of information associated with a program" of the present invention) specifically includes not only a program name and a summary description (program outline) but also a start time, a duration, a genre, a sub-genre, video and audio format information, copy control information, performers' names, a detailed description of the contents of the program, and the like. Normally, information about programs for up to about a week ahead is sent at a time.

The image and audio decoding unit 110 decodes the program contents 901 separated by the receive unit 102 and passes video data to a screen synthesis unit 111. Similarly, the image and audio decoding unit 110 passes audio information contained in the program contents 901 to an audio output unit (not shown). The image synthesis unit 111 synthesizes the program contents 901 received from the receive unit 102 through the image and audio decoding unit 110, and a graphic image, such as a background, a character, or a diagram, received from a screen generation unit 109. In the case of performing normal television viewing, the screen synthesis unit 111 passes moving image information included in the program contents 901 received from the image and audio decoding unit 110, to a display unit 112.

Figure 4A:
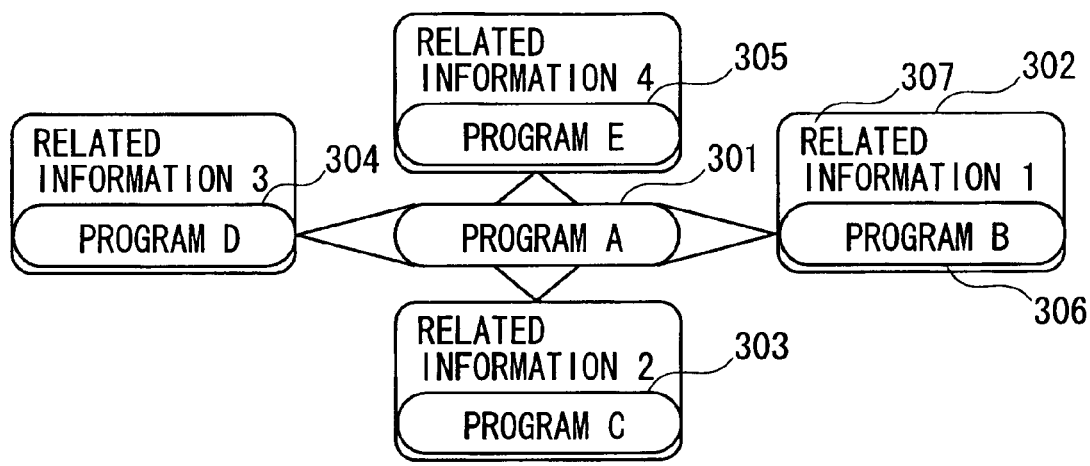
FIGS. 4A and 4B are diagrams each showing a user interface according to the embodiment of the present invention.

On the other hand, in the case of displaying a user interface according to the present invention which is shown in FIG. 4A (described later) or an EPG, the screen synthesis unit 109 generates a graphic image from background or character and diagram information including the program related information 902 which is obtained from an accumulation unit 107, and then passes the graphic image to the screen synthesis unit 111.

When the screen synthesis unit 111 obtains the graphic image from the screen generation unit 109, the screen synthesis unit 111 synthesizes the graphic image on the moving image information and passes a synthesis result to the display unit 112. The display unit 112 outputs the synthesis result from the screen synthesis unit 111 on a screen and presents it to the televiewer. Similarly, the audio output unit also outputs the obtained audio information in synchronization with the synthesis result.

The category information extraction unit 104 extracts information including character strings from the program related information 902 obtained through the receive unit 102, and then extracts information on the basis of category. The information including character strings is character string information which can be described by the sending side; for example, "program name" and "program summary description" correspond to such information. In the case of SI (Service Information), information having a program outline described therein which is included in a short event descriptor and information, such as "performer", "announcement", and "program details", which is included in an extended event descriptor also correspond to such information.

The category represents information set by a receiving apparatus to obtain unique program related information. For example, "name of person", "name of place", "track name", "car's name", "sport name", and the like serve as categories (unique categories on the receiving apparatus side). When the category is "name of person", for information about the category, the names of persons such as performers' names or supervisor's name of the program correspond to such information. The category information extraction unit 104 accumulates in the accumulation unit 107 results (hereinafter referred to as "category information extracted program related information 905") obtained by extracting information on the basis of category. A data accumulation unit for analysis 105 accumulates information necessary when the category information extraction unit 104 extracts information on the basis of category. Examples of such information include dictionaries of person names and place names. That is, the dictionaries are databases which store information. The person name dictionary stores information indicating the names of a plurality of persons. As a category, it is also possible to set a category called "attribute name of person". In that case, a person attribute name dictionary may be used. The place name dictionary stores information indicating the names of a plurality of places. As a category, it is also possible to set a category called "resort". Information belonging to this category can be extracted using a database storing the attribute names of places, such as hot springs, amusement parks, and beaches. A track name dictionary stores information indicating the names of a plurality of pieces of music. A car's name dictionary stores information indicating the names of a plurality of cars. For example, track names and cars' names may be integrated and stored in a database indicating the names of things. In that case, for the database indicating the names of things, a database can be used in which, for example, information indicating the name "earth song" is stored to be associated with information indicating that that name is a track name and information indicating the name "S200" is stored to be associated with information indicating that that name is a car's name. A sport name dictionary stores information indicating the names of a plurality of sports. In addition to the above, it is also possible to set a category such as "event name". In that case, an event name dictionary may be used. The event name dictionary stores information indicating the names of a plurality of events. Note that databases covering a plurality of categories may be provided individually or may be integrated into a single database.

Program related information 902 may exist on a particular site on the Internet. In that case, the digital television apparatus 100 can download the program related information 902 by establishing a connection to the Internet through a modem 103. Upon this, the category information extraction unit 104 extracts from the program related information 902 obtained through the modem 103 information on the basis of category of the receiving apparatus and accumulates extraction results in the accumulation unit 107. The information extraction is performed on currently broadcasted programs and programs that are expected to be broadcasted.

The accumulation unit 107 accumulates the program related information 905 extracted as information belonging to the aforementioned categories from the category information extraction unit 104. Note that information extracting processing on the basis of category by the category information extraction unit 104 can also be performed on information temporarily accumulated in the accumulation unit 107. In this case, the accumulation unit 107 directly obtains and accumulates program related information 902 from the receive unit 102 or through the modem 103 and then processing by the category information extraction unit 104 is performed at a predetermined timing.

A remote control input unit 101 receives remote control information 903 from the remote control 200 and passes the remote control information 903 to a control unit 108. The remote control information 903 includes information on the type of remote control key and information on an action (press, release, or continuously press) made on the remote control.

The control unit 108 performs control according to the remote control information 903. In the case in which the televiewer displays a user interface shown in FIG. 4A (described later), when the control unit 108 obtains remote control information 903 from the remote control input unit 101 and recognizes that it is a request to display a user interface, the control unit 108 requests a search unit 106 to perform related program search processing based on information extracted from program information on a currently viewed program. At the same time, the control unit 108 requests the screen generation unit 109 to generate a graphic image based on search results obtained by the search unit 106.

When the control unit 108 determines from remote control information 903 that it is a request to select a channel, the control unit 108 requests the receive unit 102 to select a channel and requests the screen generation unit 109 to abandon the graphic image being displayed. In addition, the control unit 108 passes a history for channel selection to a profile management unit 113. The search unit 106 performs, based on the category information extracted program related information 905 accumulated in the accumulation unit 107, a related program search based on information extracted from information associated with a newly selected program and then notifies results to the screen generation unit 109.

The profile management unit 113 receives the history of channel selection from the control unit 108 and collects logs of the viewing history of the televiewer and also accesses the accumulation unit 107 and obtains category information extracted program related information 905 on viewed programs. Then, the profile management unit 113 generates, at a predetermined timing, televiewer's preferred program information 904 based on the viewing logs and the category information extracted program related information 905.

The preferred program information 904 is information indicating: (1) the priorities of categories; and (2) the priorities of value in a category (hereinafter referred to as "category value 908"). For example, when there are categories of "name of person", "name of place", and "track name", (1) the priorities of categories are priorities of categories set in order of televiewer's preference, such as No. 1 "name of person", No. 2 "name of place", and No. 3 "track name".

(2) the priorities of the category value 908 are, when "name of person" is taken as an example, priorities of specific values in the same category in order of televiewer's preference, such as No. 1 "performer A", No. 2 "performer B", and No. 3 "performer C". Note that while (1) the priorities of categories and (2) the priorities of the category value 908 in a category are held as information common for all program genres, they are also held individually for each genre and sub-genre.

FIG. 4A is a diagram showing an exemplary presentation of a user interface (UI) according to the embodiment of the present invention. When the televiewer searches other programs related to a program (selected program) currently being viewed by the televiewer, by pressing the search key 203 on the remote control 200 with the channel of that program being selected, the user interface shown in FIG. 4A is presented on the display unit 112. An exemplary presentation is provided in FIG. 4B. A presentation is provided such that the user interface shown in FIG. 4A is synthesized on the viewing program (moving image).

Information displayed at the center of the user interface is information on a program (hereinafter referred to as a "main program 301") which serves as a search source. Here, the main program 301 shows the name of the program ("program name A") being viewed by the televiewer. Information displayed in areas in four directions, up, down, left, and right, from the main program 301 is information on programs (hereinafter referred, clockwise from right, to as "related programs 302, 303, 304, and 305") related to the main program 301.

The related programs represent programs having information common with program related information 902 on the main program. For example, a program having the same performer, supervisor, genre, music, or the like as the main program corresponds to a related program. Related programs are automatically searched by preset logical processing (described later) and up to four related programs are presented in the aforementioned peripheral areas. As information on a related program, related information 307 indicating the relation with the main program is presented as well as a program name 306. In addition to these, as information on the related program, genre information on the program or the like may be added. In FIG. 4A, a state is shown in which a focus for operation is placed on the main program 301. The focus is caused to move using the up, down, left, or right arrow key 201 on the remote control 200.

Figure 4B:
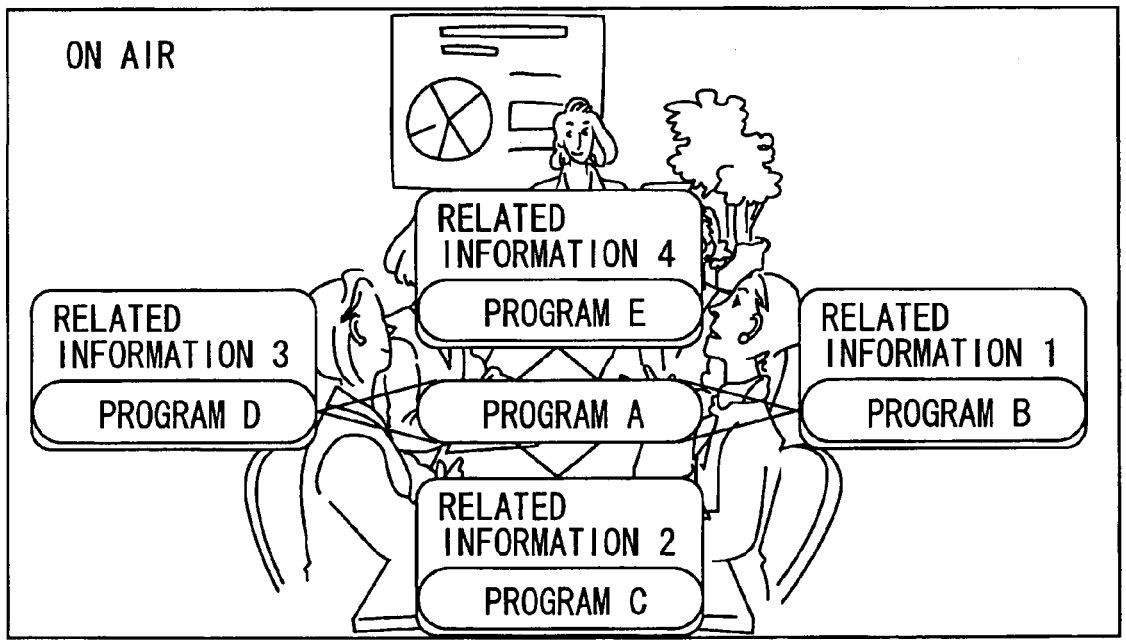

Note that although in FIG. 4B the timing at which the user interface is presented is when the televiewer is viewing the TV, the timing is not limited thereto. For example, the search key may be pressed while an EPG is being run, and in order to search programs related to a focus program (selected program) on the EPG the user interface may be presented. Note also that the exemplary presentation of UI shown in FIG. 4A is merely an example and thus the user interface can be any as long as it fulfills the same functions as those of FIG. 4A.

Figure 5:
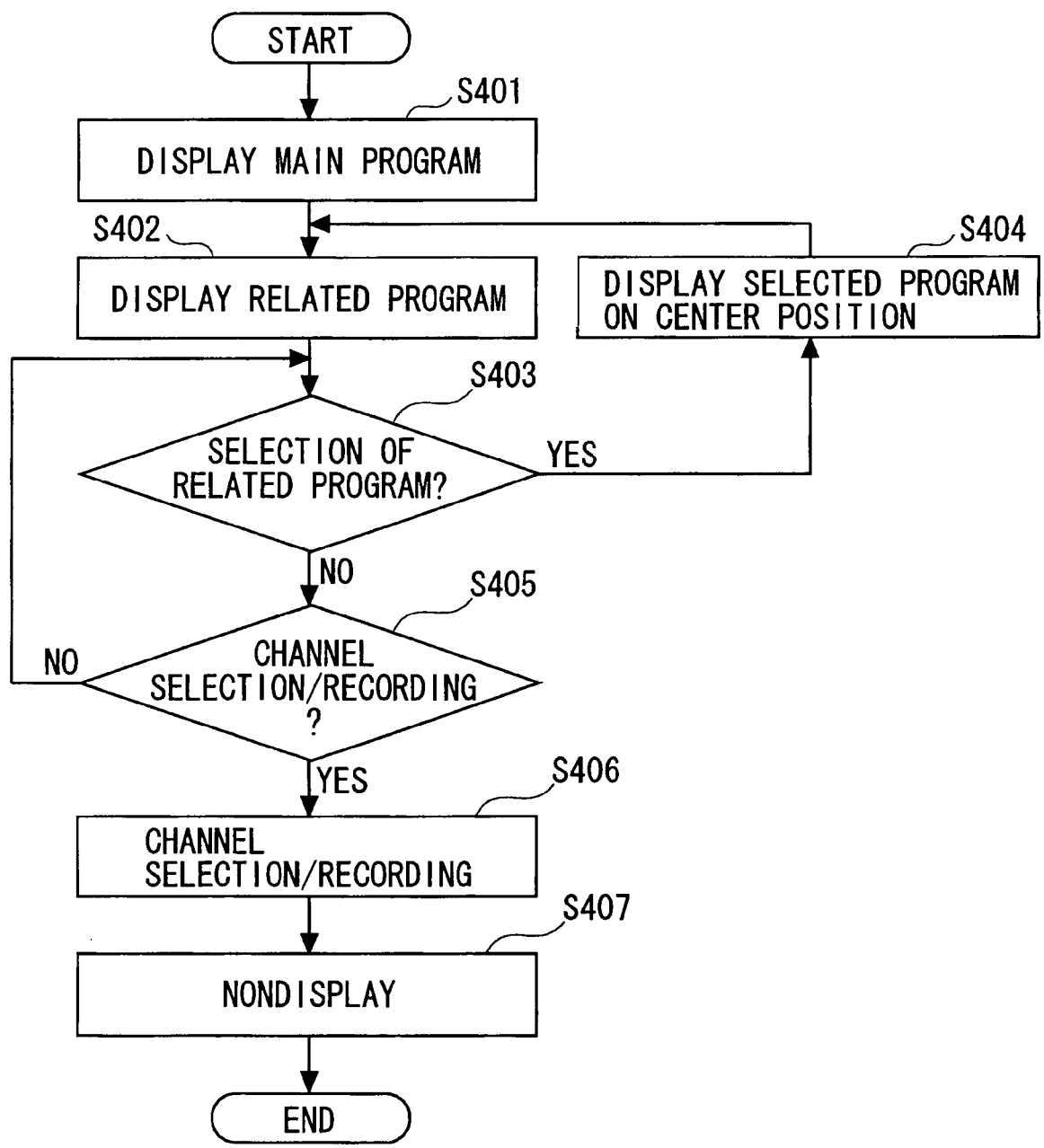
FIG. 5 is a presentation flowchart of a related program search using the user interface.

FIG. 5 is a presentation flowchart of a related program search using the user interface. When the televiewer presses the search key 203 at the aforementioned timing, the user interface is displayed (at step S401 the program name 301 of the main program in FIG. 4A is displayed, and at step S402 information on the related programs 302 to 305 are displayed), going into a state of waiting for the televiewer to make input to a remote control key. Here, when the televiewer selects one of the related programs, the selected program serves as a main program 301 and thus moves to the center position of the user interface (steps S403 and S404). Then, programs 302, 303, 304, and 305 related to the new main program 301 are displayed (step S402). Specifically, after one of the related programs (e.g., program B shown in FIG. 4) is selected, the selected program (program B) serves as the main program. Then, information corresponding to information extracted from information associated with the program B is newly searched. Then, information on programs associated with the information found by the search is displayed. After the program B is selected, the user does not need to provide any special instruction for the new search. Specifically, in the state shown in FIG. 4, an instruction to select the program B is triggered to perform a new search based on information extracted from information associated with the program B.

As long as the televiewer continues to select a related program, steps S402 to S404 are repeated. The televiewer can follow the links of the related programs with the program being viewed as a base point. When the televiewer wants to select the channel of the main program 301 or to record the main program 301, by pressing the determination key 202 on the remote control 200 during a remote control key input wait state, processing necessary for channel selection or recording is performed and thereafter the user interface is no longer displayed (steps S405, S406, and S407).

Figure 1:
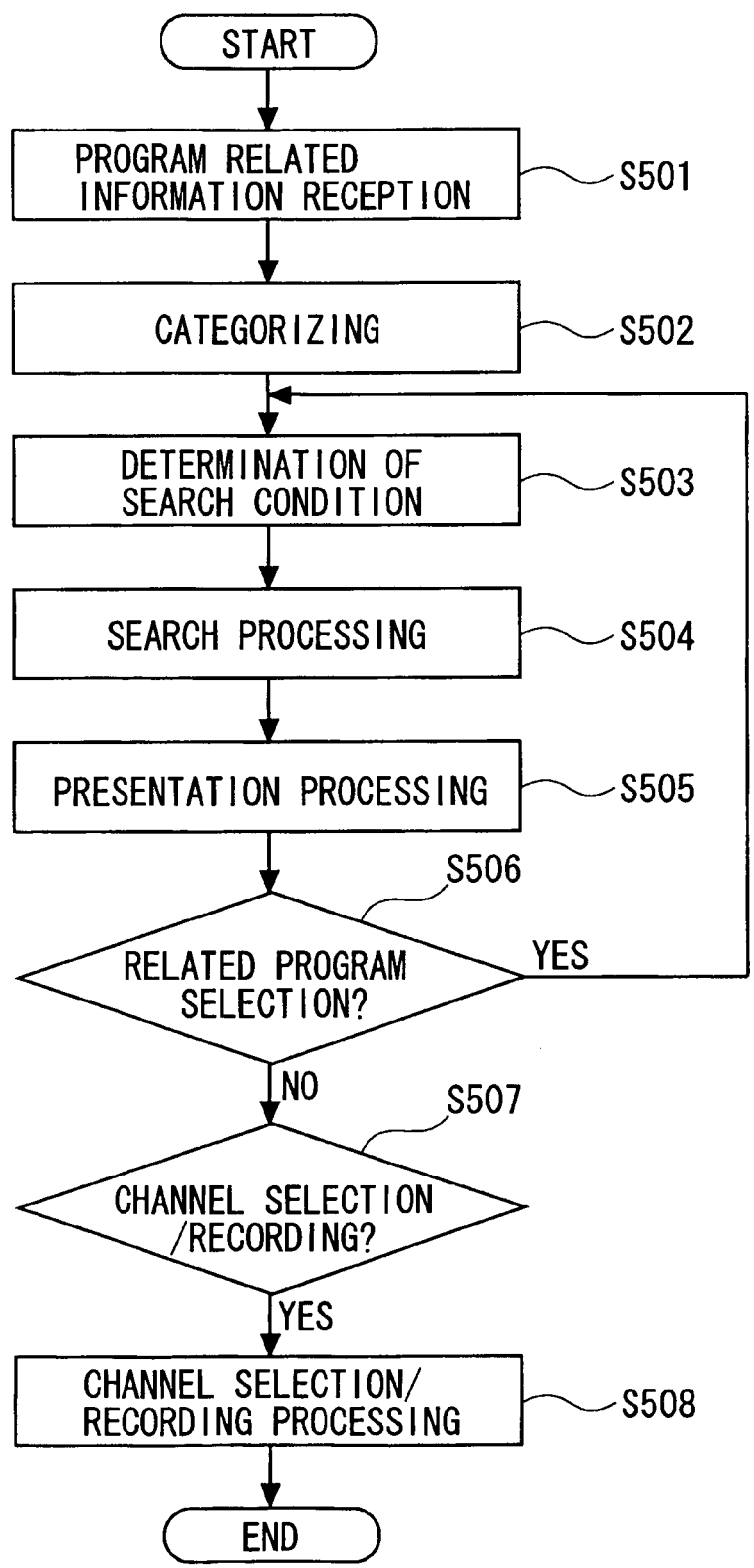
FIG. 1 is an overall processing flowchart of a related program search.

FIG. 1 is an overall processing flowchart of a related program search performed by the digital television apparatus 100. The digital television apparatus 100 obtains, at a predetermined timing, program related information 902 through the receive unit 102 or the modem 103 (step S501), and then extracts, by the category information extraction unit 104, information about categories which are set on the receiving apparatus from the program related information 902 (step S502). The predetermined timing is one in which information is obtained periodically at certain intervals (e.g., every one hour) or one in which information is obtained when the digital television apparatus 100 is turned on.

The steps after step S503 are processing triggered by an operation performed on the remote control by the televiewer viewing the program. When the search key 203 on the remote control 200 is pressed by the televiewer, the digital television apparatus 100 determines a search condition based on category information extracted program related information 905 on the viewing program (step S503) and searches related programs (step S504). Then, when the related programs are determined, the digital television apparatus 100 generates a graphic image and presents the graphic image on the display unit 112 (step S505), going into a televiewer's input state.

If the televiewer selects a related program using the remote control 200, the digital television apparatus 100 performs again search condition determination processing with the selected related program being as a base point (step S506). If the televiewer presses the determination key 202 on the remote control 200 to perform a channel selection (or recording), the digital television apparatus 100 performs predetermined channel selection processing (or recording processing) and the graphic image being displayed is no longer displayed (steps S507 and S508).

Figure 8:
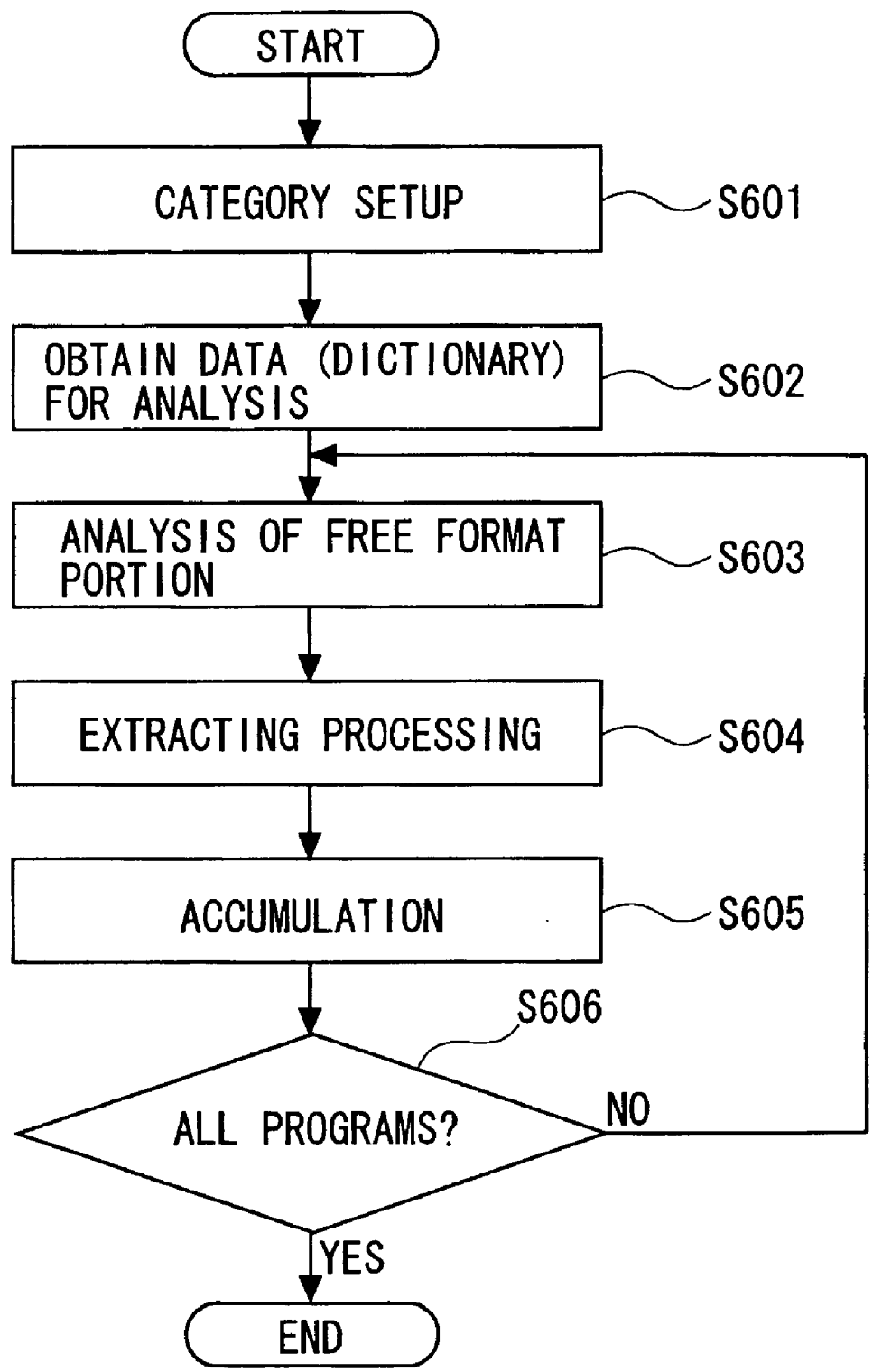
FIG. 8 is a processing flowchart of category information extracting processing.

FIG. 8 is a detailed flowchart of the category information extracting processing of step S502 in FIG. 1. In which category an extraction is performed is preset before performing extracting processing (step S601). A category setup can be performed by a method in which the setup is performed manually by the televiewer or a method in which the setup is performed automatically by the digital television apparatus 100.

Figure 6:
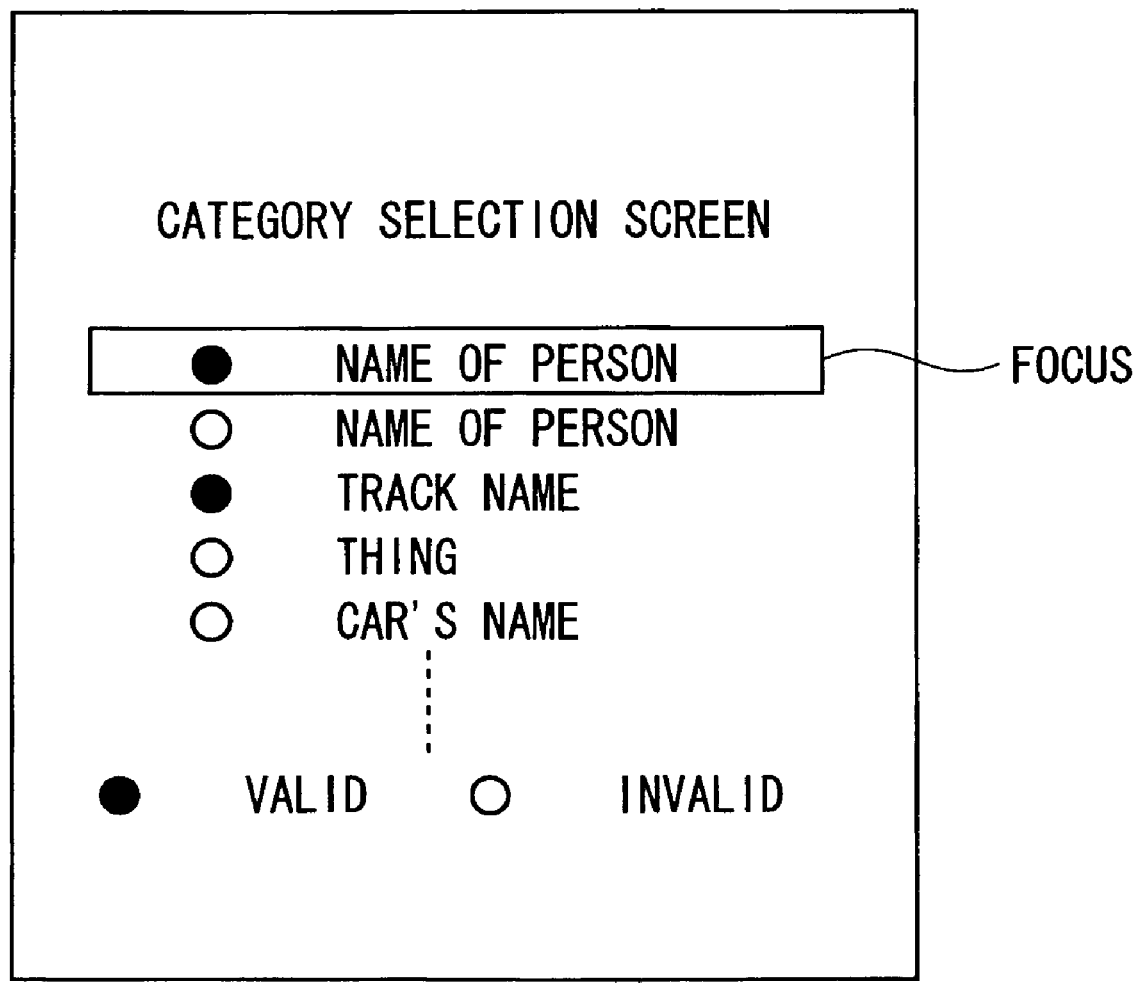
FIG. 6 is a diagram showing an exemplary presentation for setting a category type.

In the case of (1) the manual setup by the televiewer, a method is available in which as shown in FIG. 6 the digital television apparatus 100 presents a plurality of types of categories which are prepared in advance and the televiewer selects categories from the categories or rearranges the categories. In the case of (2) the automatic setup, priorities of all types of categories which are prepared in advance are set by a category priority 906 held in the profile management unit 113 (see FIG. 2) and a predetermined number of categories belonging to top priorities (e.g., top three) is set as categories used in extracting processing. FIG. 12 is a diagram showing exemplary category priority 906. In the exemplary diagram, top three categories, "name of person", "track name", and "name of place", are set as categories used in extracting processing.

FIG. 13 is a diagram showing an exemplary flow of determining the category priority 906 by the profile management unit 113. In order to determine the category priority 906, the profile management unit 113 uses viewing logs and category information extracted program related information 905. Specifically, the profile management unit 113 identifies, from the viewing logs, programs having been viewed by the televiewer and then determines category value 908 for each category from character string information included in program related information 902 on the identified programs (corresponding to program related information 905 obtained by extracting information belonging to a category).

An "example of program related information 905" in FIG. 13 is exemplary category information extracted program related information 905 on the programs identified by the viewing logs. For example, when the category is "name of person", the category value 908 includes a performer's name and a supervisor's name. The profile management unit 113 records the number of accumulations (accumulation value) of the same category value 908 from the category information extracted program related information 905.

In the example of FIG. 13, the profile management unit 113 records accumulation values such that: (1) the accumulation value of "performer A" which is the name of person is "4"; (2) the accumulation value of "classic music C" which is a track name is "3"; and (3) the accumulation value of "place B" which is the name of place is "2". Then, a category that includes category value 908 having a high accumulation value is set to high priority.

In FIG. 13, based on the results of the magnitude relation of the accumulation values such that "performer A" >"classic music C" >"place B", the profile management unit 113 records the category priority 906 such that No. 1 is "name of person", No. 2 is "track name", and No. 3 is "name of place".

When the setup at step S601 is done, the category information extraction unit 104 obtains or updates a dictionary (corresponding to the "database" of the present invention) necessary for extraction (step S602). For example, if, at step S601, "name of person", "name of place", and "track name" are set as categories, the category information extraction unit 104 of FIG. 2 checks if dictionaries of "name of person", "name of place", and "track name" are accumulated in the data accumulation unit for analysis 105. If any of the dictionaries of "name of person", "name of place", and "track name" is lacking, the category information extraction unit 104 obtains data from an outside source through the modem 103 and accumulates the obtained data in the data accumulation unit for analysis 105. The dictionaries of "name of person", "name of place", and "track name" are used in extracting processing.

Note that the "outside source" indicates the broadcasting station 300 or a website related thereto or a third person's website providing the aforementioned dictionaries. Note also that step S602 is performed when the category setup at step S601 is manually performed; when the category setup is automatically performed, step S602 is performed prior to step S601.

Thereafter, a free format portion (a portion in which a program name, a summary description (program outline), and detailed contents of a program are described) is extracted from program related information 902 (see FIG. 2) obtained through the receive unit 102 or the modem 103 (step S603), and words and the parts of speech of the words are identified from character strings by morphological analysis (step S604). At this step, using the dictionaries held in the data accumulation unit for analysis 105, processing up to the point where "name of person" and "name of place" are identified (extracted) is performed.

FIG. 10 is a diagram showing the flow of the aforementioned steps S603 and S604 using "name of person" and "name of place" as an example. Information 801 corresponds to program related information 902 (see FIG. 2) on "program A" and is information (categorized information) which is already categorized by the broadcasting station 300. Here, the categorized information includes "program name", "broadcasting date", "start time", "duration", "genre", "program outline", "program details", and "performer". The categorized information is the same information as SI (Service Information) which is implemented in digital broadcasting. For example, to extract the name of person, by referring only to an area in which is described information which is already classified into the category of performers by the sending side, a performer can be extracted. However, in many cases, the name of person is described in areas other than the area in which performers are described. In the present embodiment, even when information associated with a program already includes an area specialized in information on the name of person, extraction is performed on areas other than that area as an extraction object (the area of performers may also be an extraction object), whereby extraction failure can be reduced.

Information 802 is obtained by extracting from the information 801 only information including character strings that can be used as a search condition. In FIG. 10, "program name", "program outline", "program details", and "performer" correspond to the information including character strings. When "genre" is also sent as character string information, the "genre" is included in the information 802. Information 803 is obtained by extracting from the information 802 only information about "name of person".

The information 802 includes "name of person" in the categories as follows: (1) "Mr. MS" in the program name; (2) "Miss NS" and "Mr. ST" in the program outline; (3) "Mr. T" and "Mr. G" in the program details; and (4) "Miss TY" and "Mr. HS" in the performer. Hence, the information 803 is information obtained by extracting "name of person" from a plurality of categories in the information 802. In the information 803, character strings are cut out at word level and only nouns (proper nouns) are extracted, and then, matching is performed with the person name dictionary, whereby person's name nouns are identified.

Information 804 is obtained by extracting from the information 802 only information about "name of place". The information 802 includes the name of place in the categories as follows: "Shinjuku" and "Kabuki-cho" in the program outline and "K country" in the program details. Hence, the information 804 is information obtained by extracting "name of place" from a plurality of categories in the information 802. As in the information 803, in the information 804, character strings are cut out at word level and only nouns (proper nouns)

are extracted, and then, matching is performed with the place name dictionary, whereby place's name nouns are identified. As described above, using dictionaries (data for analysis) that cover preset categories, information about the categories is extracted.

The category information extraction unit 104 extracts information 803 and information 804 for each program and then adds the extracted information as additional information to the related program information 902 (corresponding to the category information extracted program related information 905) and accumulates the information in the accumulation unit 107 (step S605). The aforementioned processing is performed on all programs (step S606). Note that although the present embodiment employs a configuration in which this extracting processing is performed in advance on a plurality of programs, the present invention is not limited thereto. For example, when a program is selected, information may be extracted from a group of information which is associated with the selected program.

By the processing shown in FIG. 8, the digital television apparatus 100 performs unique categorization which is independent of the data structure of program related information 902 sent from the broadcasting station 300. Note that information 803 and information 804 may be directly extracted from information 801.

Figure 9:
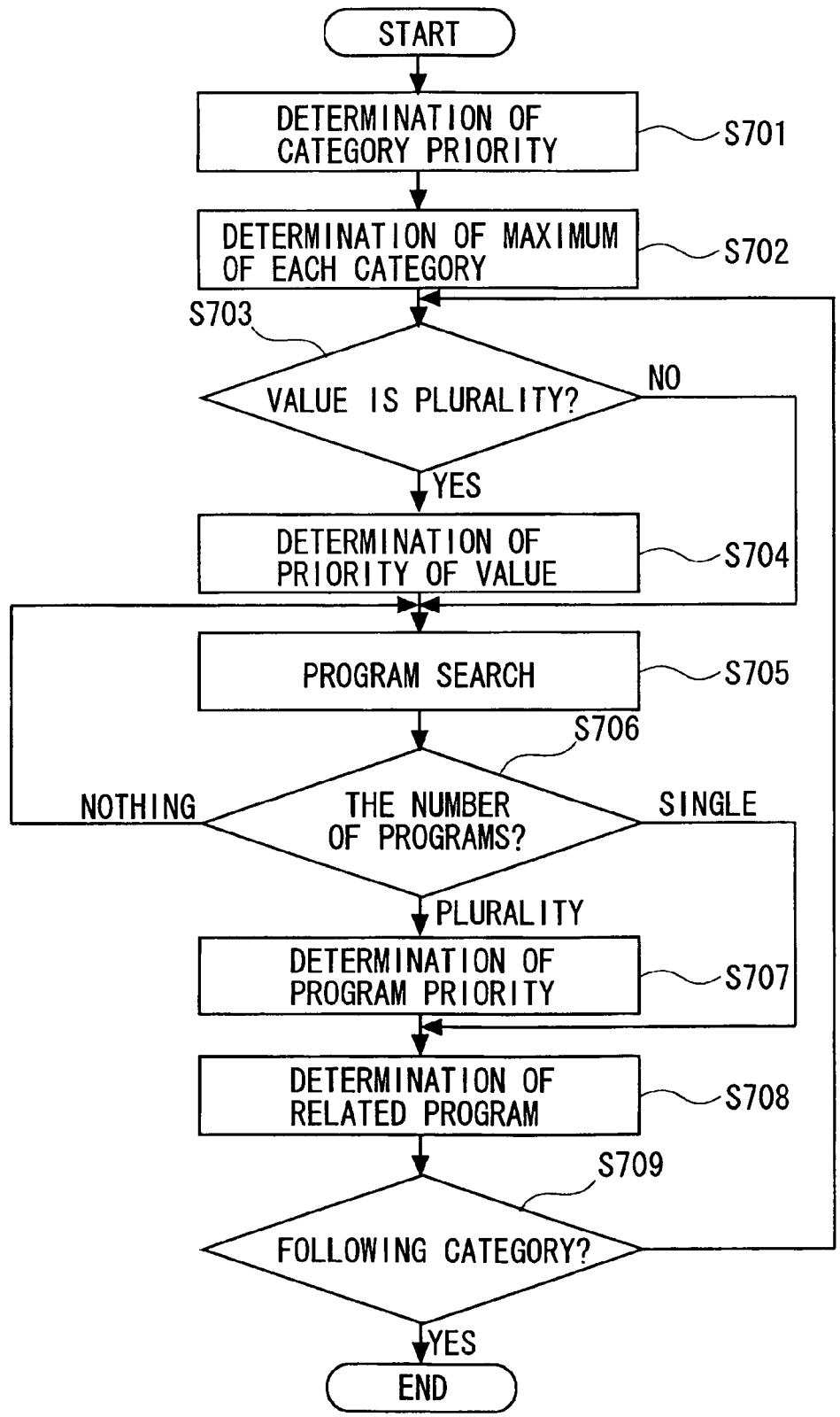
FIG. 9 is a processing flowchart of search condition determination and search execution processing.

FIG. 9 is a detailed flowchart of search processing of steps S503 and S504 in FIG. 1. The steps of determining a search condition are steps S701 and S702. When the televiewer presses the search key 203 on the remote control 200, the control unit 108 obtains a category priority 907 classified by genre of a viewing program (which is a selected program and a program being viewed) from the profile management unit 113, according to a search request received through the remote control 200 (step S701).

The category priority 907 classified by genre is obtained by setting priorities for genres in the same manner as the aforementioned priorities set to determine the category priority 906. The profile management unit 113 generates and holds category priority 907 classified by genre based on (1) the viewing logs of the televiewer and (2) the category information extracted program related information 905 (see FIG. 2) (corresponding to the preferred program information 904 and the "step of obtaining a category priority" of the present invention).

FIG. 11 is a diagram showing exemplary category priority 907 classified by genre. The categories shown in FIG. 11 are (1) categories manually selected by the televiewer or (2) categories automatically selected at step S601 of FIG. 8. Here, "name of person", "track name", "name of place", "sport name", "store name", and "car's name" are selected. For example, at step S701, if the televiewer is viewing a drama, as a category priority, priorities such as (1) the name of person, (2) track name, and (3) the name of place are obtained. Here, the profile management unit 113 may extract information about genres from the information 801. Alternatively, buttons which are assigned with genres may be provided on the remote control 200 and the profile management unit 113 may obtain information about genres according to a signal sent in response to an operation performed on any of the buttons by the user.

Then, the control unit 108 obtains from the profile management unit 113 a maximum of each category of the viewing program (step S702). The maximum of each category represents the maximum number of programs that can be displayed with the same category when a related program search is performed. For example, when a search is performed for the category "name of person", if the "maximum is two", the search for the name of person ends at a stage where two programs having the same name of person have been searched, and processing follows a next category search.

The steps after step S703 shows a detailed flowchart of the search processing step S504. The control unit 108 requests the search unit 106 for a search based on the category priority 907 and the maximums of the categories which are obtained at steps S701 and S702.

The search unit 106 obtains from the accumulation unit 107 information about a category with highest priority among the category priority 907 obtained at step S701. For example, when the category with highest priority is "name of person", the search unit 106 obtains from the accumulation unit 107 the category value 908 of the category information extracted program related information 905 on the viewing program.

The category value 908 belonging to the category of "name of person" corresponds to information on the name of person extracted from a group of information which is associated with a selected program, and it is likely that "performer's name" or "voice artist's name" appearing on the selected program corresponds to the category value 908. Here, as an example, it is assumed that the obtained category value 908 is "performer A", "performer B", and "performer C". Then, a determination is made as to whether the obtained category value 908 is plural (step S703).

If, at step S703, the obtained category value 908 is singular, information having that value is searched from information accumulated in the accumulation unit 107 (step S705). Specifically, if the category value 908 belonging to the category of "name of person" which is extracted from a group of information associated with the viewing program is singular, a search is performed for the "name of person (category value)". Note that when a search is performed for a certain category value, it is desirable to also search a synonym or near-synonym of that category value. For example, a certain category value may be included, with an abbreviation or another name, in a group of information associated with other programs. Thus, it is ideal to perform a search for information (the same one, the one having the same meaning, or the one having nearly the same meaning) corresponding to extracted information.

If the information (category value 908) extracted from the group of information associated with the viewing program as information belonging to the category of "name of person" is plural (Yes at "step S703"), the search unit 106 requests the profile management unit 113 to set priorities for the obtained category value 908.

The profile management unit 113 having received a request sets priorities for the category value 908 and returns results to the search unit 106 (step S704). The search unit 106 performs a search using category value 908 with highest priority among the priorities obtained at step S704 (step S705). In the present embodiment, since the obtained category value 908 is plural such as "performer A", "performer B", and "performer C", the search unit 106 requests, at step S704, the profile management unit 113 to set priorities for the "performer A", "performer B", and "performer C". Here, at step S704, the profile management unit 113 returns the search unit 106 priority results such as, for example, 1. "performer A", 2. "performer B", and 3. "performer C". Then, at step S705, the search unit 106 performs a search for the "performer A" which has highest priority.

A determination is made as to the number of programs hit as the result of search at step S705 (step S706). If a single program is hit, that program is determined to be a related program. If there is no hit program, processing once again returns to step S705 and a search is performed again for category value 908 with the second highest priority. On the other hand, as the result of search, if a plurality of programs are hit, the search unit 106 requests the profile management unit 113 to set priorities for the programs.

The profile management unit 113 having received a request sets priorities for the obtained programs and returns results to the search unit 106 (step S707). For example, if a plurality of search results are obtained at step S705 such as "program X", "program Y", and "program Z", the search unit 106 once again requests the profile management unit 113 to set priorities for the programs. Here, at step S707, the profile management unit 113 returns the search unit 106 priority results such as, for example, 1. "program X", 2. "program Y", and 3. "program Z".

With reference to the priorities obtained at step S707, the search unit 106 determines the number of programs that matches the maximum obtained at step S702 to be related programs (step S708). Specifically, the search unit 106 determines the "program X" with highest priority to be a related program. Then, the search unit 106 compares the number of displayable related programs with the number of the related programs determined as the result of search. If the number does not reach the number of displayable related programs, processing follows a next category and a search for a related program is performed again (step S709).

According to the present embodiment, in a program display method upon performing a related program search, the search is performed simply using a plurality of pieces of information included in program related information, and thus, a method capable of searching a variety of related programs can be provided. In addition, since upon searching the televiewer does not need to consciously select the information, operability is improved.

Furthermore, by providing in the digital television apparatus 100 a means of extracting not only category information included in program related information 902 sent from the broadcasting station 300 but also information, from the program related information 902, which is oriented to category information in which the televiewer has an interest, it is possible to search related programs independent of the sending side and to be more oriented to televiewer's preferences.

Note that although in the present embodiment a description is made using the digital television apparatus 100 as an object, the present embodiment is not limited to the digital television apparatus 100 and any apparatus can be used as long as the apparatus has the same functions as the digital television apparatus 100. In addition, the contents are not limited to programs; for example, the present invention can also be applied to the case in which a search is performed for a scene of a program.

As described above, in the present embodiment, by performing a search using a plurality of keywords at a time, programs having different associations can be searched at a time. In addition, since a keyword is automatically determined for each category, the operation of determining a keyword by the user can be omitted.

According to the present invention, information on programs related to a selected program can be suitably displayed.

This application claims priority from Japanese Patent Application No. 2005-170880 filed Jun. 10, 2005, which is hereby incorporated by reference herein.

What is claimed is:

1. A display method performed by a digital television apparatus comprising:
    using the digital television apparatus to receive program information related to each of a plurality of programs;
    a determining step of categorizing character strings included in the received program information into a predetermined plurality of categories, and determining priorities of the plurality of categories based on user preference information and the categorized character strings;
    a step of receiving a search instruction, in response to a user input, to search a plurality of related programs which relate to a viewing program when a video of the viewing program is displayed on a screen of the digital television apparatus;
    a searching step of searching for the plurality of related programs from among the plurality of programs in response to the search instruction, by using a category which has higher priority than a predetermined value;
    a step of displaying a program name of the viewing program overlapped with the video of the viewing program, and arranging program names of the plurality of related programs which relate to the viewing program on the left, right, top and bottom of the program name of the viewing program,
    wherein focus is initially placed on the program name of the viewing program,
    wherein the program names of the plurality of related programs are configured to be selectable in response to a user operation to move the focus from the initial placement on the program name of the viewing program to left or right or top or bottom,
    wherein the display method performed by the digital television apparatus further comprises a step of re-searching for a plurality of related programs which relate to a newly selected program in response to a user operation to move the focus, and displaying the newly selected program as a main program such that program names of the related programs relating to the newly selected program are displayed on the left, right, top and bottom of the program name of the newly selected program,
    wherein the video of the viewing program is displayed on the screen such that it is viewable by a user during the searching step, during the selection of a related program, and during the re-searching step, and
    wherein in response to receiving an instruction from the user, the main program is selected for at least one of viewing and recording.

2. The display method performed by the digital television apparatus according to claim 1, wherein
    the determining step determines the priorities of the plurality of categories for each program genre;
    the searching step and the re-searching step search for the related program by using a category which has higher priority than the predetermined value in the genre to which the viewing program belongs.

3. The display method performed by the digital television apparatus according to claim 1, wherein
    said plurality of categories include at least one category of name of person, name of thing, name of place, and name of event.

4. A display control apparatus comprising:
    a first receiving unit constructed to receive program information related to each of a plurality of programs;
    a determining unit constructed to categorize character strings included in the received program information into a predetermined plurality of categories, and to determine priorities of the plurality of categories based on user preference information and the categorized character strings;

a second retrieving unit constructed to receive a search instruction, in response to a user input, to search a plurality of related programs which relate to a viewing program when a video of the viewing program is displayed on a screen of the digital television apparatus;

a searching unit constructed to search for the plurality of related programs from among the plurality of programs in response to the search instruction, by using a category which has higher priority than a predetermined value; and a screen constructed to display a program name of the viewing program overlapped with the video of the viewing program, and arranging program names of the plurality of related programs which relate to the viewing program on the left, right, top and bottom of the program name of the viewing program, wherein focus is initially placed on the program name of the viewing program, wherein the program names of the plurality of related programs are configured to be selectable in response to a user operation to move the focus from the initial placement on the program name of the viewing program to left or right or top or bottom, wherein the display control apparatus further comprises a re-searching unit constructed to search for a plurality of related programs which relate to the selected program in response to a user operation to move the focus, and constructed to display the newly selected program as a main program such that program names of the related programs relating to the newly selected program are displayed on the left, right, top and bottom of the program name of the newly selected program, wherein the video of the viewing program is displayed on the screen such that it is viewable by a user during the searching by the searching unit, during selection of a related program, and during the re-searching by the re-searching unit, and wherein in response to receiving an instruction from the user, the main program is selected for at lest one of viewing and recording.

5. The display control apparatus according to claim 4, wherein the determining unit determines the priorities of the plurality of categories for each program genre;

the searching unit and the re-searching unit search for the related program by using a category which has higher priority than the predetermined value in the genre to which the viewing program belongs.

6. The display control apparatus according to claim 4, wherein said plurality of categories include at least one category of name of person, name of thing, name of place, and name of event.

7. The display method performed by the digital television apparatus according to claim 1, wherein the re-searching step is executed such that the program name of the newly selected program is moved to the position where the program name of the viewing program is displayed, and the program names of the programs related to the newly selected program are displayed on the left, right, top and bottom of the program name of the newly selected program.

8. The display control apparatus according to claim 4, wherein the re-searching unit executes re-searching such that the program name of the newly selected program is moved to the position where the program name of the viewing program is displayed, and the program names of the programs related to the newly selected program are displayed on the left, right, top and bottom of the program name of the newly selected program.

9. A display method performed by a digital television apparatus comprising:

using the digital television apparatus to receive program information related to each of a plurality of programs;

a step of receiving a search instruction, in response to a user input, to search a plurality of related programs which relate to a viewing program when a video of the viewing program is displayed on a screen of the digital television apparatus;

a searching step of searching for the plurality of related programs from among the plurality of programs in response to the search instruction; and a step of displaying a program name of the viewing program overlapped with the video of the viewing program, and arranging program names of the plurality of related programs which relate to the viewing program on the left, right, top and bottom of the program name of the viewing program, wherein focus is initially placed on the program name of the viewing program, wherein the program names of the plurality of related programs are configured to be selectable in response to a user operation to move the focus from the initial placement on the program name of the viewing program to left or right or top or bottom, wherein the display method performed by the digital television apparatus further comprises a step of re-searching for a plurality of related programs which relate to a newly selected program in response to a user operation to move the focus, and displaying the newly selected program as a main program such that program names of the related programs relating to the newly selected program are displayed on the left, right, top and bottom of the program name of the newly selected program, wherein the video of the viewing program is displayed on the screen such that it is viewable by a user during the searching step, during selection of a related program, and during the re-searching step, and wherein in response to receiving an instruction from the user, the main program is selected for at lest one of viewing and recording.

10. A display control apparatus comprising:

a first receiving unit constructed to receive program information related to each of a plurality of programs;

a second receiving unit constructed to receive a search instruction, in response to a user input, to search a plurality of related programs which relate to a viewing program when a video of the viewing program is displayed on a screen of the digital television apparatus;

a searching unit constructed to search for the plurality of related programs from among the plurality of programs in response to the search instruction; and a screen constructed to display a program name of the viewing program overlapped with the video of the viewing program, and arranging program names of the plurality of related programs which relate to the viewing program on the left, right, top and bottom of the program name of the viewing program, wherein focus is initially placed on the program name of the viewing program, wherein the program names of the plurality of related programs are configured to be selectable in response to a user operation to move the focus from the initial placement on the program name of the viewing program to left or right or top or bottom, wherein the display control apparatus further comprises a re-searching unit constructed to search for a plurality of related programs which relate to the selected program in response to a user operation to move the focus, and constructed to display the newly selected program as a main program such that program names of the related programs relating to the newly selected program are displayed on the left, right, top and bottom of the program name of the newly selected program, wherein the video of the viewing program is displayed on the screen such that it is viewable by a user during the searching by the searching unit, during selection of a related program, and during the re-searching by the re-searching unit, and wherein in response to receiving an instruction from the user, the main program is selected for at lest one of viewing and recording.

* * * * *